(12) United States Patent
Cederqvist et al.

(10) Patent No.: US 11,609,080 B2
(45) Date of Patent: Mar. 21, 2023

(54) ASSEMBLY, ADAPTER DEVICE, AND METHOD FOR MEASURING THE HEIGHT OF A FLANGE

(71) Applicant: Volvo Car Corporation, Gothenburg (SE)

(72) Inventors: Krister Cederqvist, Gothenburg (SE); Fredrik Sjöberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 92 days.

(21) Appl. No.: 17/352,580

(22) Filed: Jun. 21, 2021

(65) Prior Publication Data
US 2021/0404787 A1    Dec. 30, 2021

Related U.S. Application Data

(60) Provisional application No. 63/043,833, filed on Jun. 25, 2020.

(51) Int. Cl.
*G01B 5/00* (2006.01)
*G01B 3/28* (2006.01)
*G01B 5/20* (2006.01)

(52) U.S. Cl.
CPC ............ *G01B 5/0025* (2013.01); *G01B 3/28* (2013.01); *G01B 5/20* (2013.01)

(58) Field of Classification Search
USPC ............................ 33/608, 826, 828, 831, 833
See application file for complete search history.

(56) References Cited

U.S. PATENT DOCUMENTS

| 623,748 | A | * | 4/1899 | Walters | G01B 3/28 |
| | | | | | 33/836 |
| 1,656,302 | A | | 1/1928 | Swaney | |
| 2,661,539 | A | | 12/1953 | Lovenston | |
| 2,855,687 | A | | 10/1958 | Price | |
| 3,128,559 | A | * | 4/1964 | Winter | G01B 3/28 |
| | | | | | 33/672 |
| 3,195,237 | A | * | 7/1965 | Aldeborgh | G01B 3/28 |
| | | | | | 33/836 |

(Continued)

FOREIGN PATENT DOCUMENTS

JP    H09243305 A    9/1997

OTHER PUBLICATIONS

Oct. 27, 2021 European Search Report issued in International Application No. 21180930.

*Primary Examiner* — Christopher W Fulton
(74) *Attorney, Agent, or Firm* — Clements Bernard Walker; Christopher L. Bernard (57) ABSTRACT

The present disclosure provides an assembly, adapter device, and method that utilize a standard displacement gauge or the like, well known to those of ordinary skill in the art, to measure the height of a flange, such as a flange formed via bending a planar vehicle component with a given thickness and, thus, including a radius at the bottom interior of the flange. This assembly, adapter device, and method provide consistent measurements across components, operators, education and experience levels, etc. The adapter device is designed to engage the flange being measured in such a way that consistent engagement of the adapter device with the radius, and, thus, consistent engagement of the assembly with the flange, is provided for measurement.

17 Claims, 8 Drawing Sheets

(56) References Cited

U.S. PATENT DOCUMENTS

| | | | | |
|---|---|---|---|---|
| 3,352,018 A * | 11/1967 | Mazeika | ............... | G01B 3/28 33/836 |
| 4,132,001 A * | 1/1979 | Petrik | ............... | G01B 3/18 33/828 |
| 4,642,900 A * | 2/1987 | Provost | ............... | G01B 5/003 33/606 |
| 4,653,191 A * | 3/1987 | Gasser | ............... | G01B 5/061 33/833 |
| 5,077,909 A * | 1/1992 | Cranor | ............... | F01L 1/46 33/607 |
| 5,170,569 A * | 12/1992 | Anderson | ............... | G01B 5/0023 33/794 |
| 7,000,331 B2 * | 2/2006 | Kennedy | ............... | G01B 3/22 33/833 |
| 7,171,760 B1 * | 2/2007 | Lemon | ............... | B23D 59/002 33/833 |
| 7,762,005 B2 * | 7/2010 | Pelotte | ............... | G01B 3/28 33/833 |
| 2005/0120575 A1 * | 6/2005 | Molmann | ............... | G01B 3/22 33/679.1 |

\* cited by examiner

ASSEMBLY, ADAPTER DEVICE, AND METHOD FOR MEASURING THE HEIGHT OF A FLANGE

CROSS-REFERENCE TO RELATED APPLICATION

The present disclosure claims the benefit of priority of U.S. Provisional Patent Application No. 63/043,833, filed on Jun. 25, 2020, and entitled "ASSEMBLY, ADAPTER DEVICE, AND METHOD FOR MEASURING THE HEIGHT OF A FLANGE," the contents of which are incorporated in full by reference herein.

TECHNICAL FIELD

The present disclosure relates generally to the automotive and manufacturing fields. More particularly, the present disclosure relates to an assembly, adapter device, and method for measuring the height of a flange, such as a flange of a vehicle component.

BACKGROUND

In automotive and other manufacturing processes, it is often desirable to measure various components to ensure manufacturing tolerances and product quality. For example, it is often desirable to measure the height of flanges of various components to ensure appropriateness and consistency. Typically, these flanges are formed via bending a planar component with a given thickness and, thus, include a radius at the bottom interior of the flange. This makes measuring the height of the flanges somewhat challenging and there may be considerable variability in measurements made by different operators. Such variability based on component shape and operator education, procedure, and experience is not desirable and may sacrifice manufacturing tolerances and product quality.

The present background is provided as environmental context only and should not be construed to be limiting. It will be readily apparent to those of ordinary skill in the art that the concepts of the present disclosure may be implemented in other environmental contexts in a similar manner.

SUMMARY

The present disclosure provides an assembly, adapter device, and method that utilize a standard displacement gauge or the like, well known to those of ordinary skill in the art, to measure the height of a flange, such as a flange formed via bending a planar vehicle component with a given thickness and, thus, including a radius at the bottom interior of the flange. This assembly, adapter device, and method provide consistent measurements across components, operators, education and experience levels, etc. The adapter device is designed to engage the flange being measured in such a way that consistent engagement of the adapter device with the radius, and, thus, consistent engagement of the assembly with the flange, is provided for measurement.

In one illustrative embodiment, the present disclosure provides an assembly for measuring a height of a flange of a component, including: a displacement gauge including a measuring rod that is adapted to contact and be linearly translated by an end of the flange; and an adapter device coupled to the displacement gauge, wherein the adapter device includes a first arm and a second arm defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the component adjacent to the flange. An end of at least one of the first arm and the second arm is tapered. An end of at least one of the first arm and the second arm terminates in a radius. At least one of the first arm and the second arm is adapted to contact a radius joining the component and the flange at a base of the flange. Optionally, a tip of the measuring rod of the displacement gauge protrudes from the channel and an end of each of the first arm and the second arm by a distance corresponding to a thickness of the component such that the thickness of the component is accounted for in a measurement of the height of the flange of the component as measured by displacement of the measuring rod by the end of the flange. Optionally, the assembly further includes a processor and a memory coupled to the displacement gauge operable for recording a linear translation of the measuring rod and measurement of the height of the flange of the component.

In another illustrative embodiment, the present disclosure provides an adapter device for measuring a height of a flange of a component, including: a base structure adapted to be coupled to a displacement gauge including a measuring rod that is adapted to contact and be linearly translated by an end of the flange; and a first arm and a second arm coupled to the base structure and defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the component adjacent to the flange. An end of at least one of the first arm and the second arm is tapered. An end of at least one of the first arm and the second arm terminates in a radius. At least one of the first arm and the second arm is adapted to contact a radius disposed between the component and the flange at a base of the flange. The base structure forms a clamp adapted to secure the adapter device to the displacement gauge. Optionally, a tip of the measuring rod of the displacement gauge protrudes from the channel and an end of each of the first arm and the second arm by a distance corresponding to a thickness of the component such that the thickness of the component is accounted for in a measurement of the height of the flange of the component as measured by displacement of the measuring rod by the end of the flange.

In a further illustrative embodiment, the present disclosure provides a method for measuring a height of a flange of a component, including: providing a displacement gauge including a measuring rod that is adapted to contact and be linearly translated by an end of the flange; providing an adapter device coupled to the displacement gauge, wherein the adapter device includes a first arm and a second arm defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the component adjacent to the flange; calibrating the displacement gauge to compensate for a thickness of the component; disposing the first arm on the first side of the flange and the second arm on the second side of the flange; and measuring the linear translation of the measuring rod by the end of the flange. An end of at least one of the first arm and the second arm is tapered. An end of at least one of the first arm and the second arm terminates in a radius. At least one of the first arm and the second arm is adapted to contact a radius disposed between the component and the flange at a base of the flange. Optionally, the method includes calibrating the displacement gauge to compensate for the thickness of the component by linearly translating the measuring rod away from the displacement gauge corresponding to the thickness of the component and zeroing the displacement gauge. Optionally, the method further includes limiting the linear translation of the measuring rod away from the displacement gauge using a calibration sleeve that is disposed about the adapter device. Optionally, the calibration sleeve is one of a plurality of calibration sleeves each corresponding to a given component thickness. Optionally, the method further includes recording the linear translation of the measuring rod and measurement of the height of the flange of the component using a processor and a memory coupled to the displacement gauge.

BRIEF DESCRIPTION OF THE DRAWINGS

The present disclosure is illustrated and described with reference to the various drawings, in which like reference numbers are used to denote like assembly/device components or method steps, as appropriate, and in which.

DETAILED DESCRIPTION

Again, the present disclosure provides an assembly, adapter device, and method that utilize a standard displacement gauge or the like to measure the height of a flange, such as a flange formed via bending a planar vehicle component with a given thickness and, thus, including a radius at the bottom. This assembly, adapter device, and method provide consistent measurements across components, operators, education and experience levels, etc. The adapter device is designed to engage the flange being measured in such a way that consistent engagement of the adapter device with the radius, and, thus, consistent engagement of the assembly with the flange, is provided for measurement.

Figure 1:
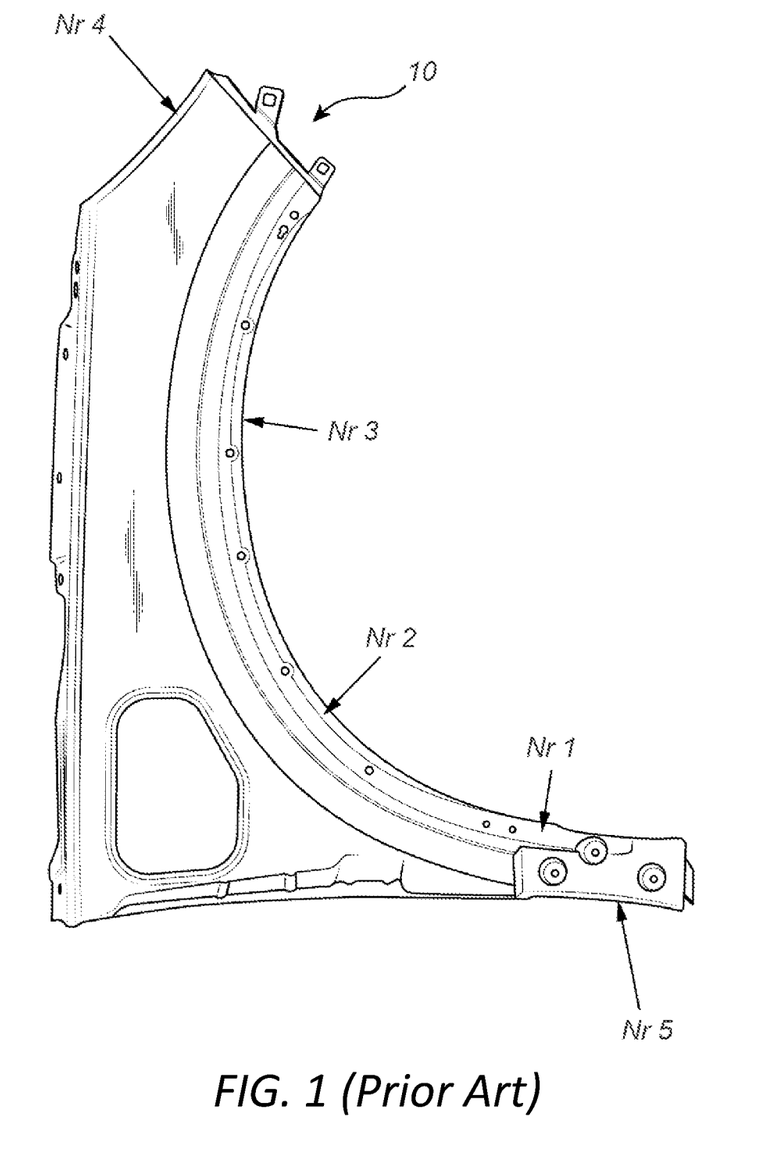
FIG. 1 illustrates a typical vehicle component including a plurality of flanges that it is desirable to measure.

FIG. 1 illustrates a typical vehicle component 10 including a plurality of flanges, Nr1, Nr2, Nr3, Nr4, and Nr5, that it is desirable to measure. Here, the vehicle component 10 is made from a thin sheet of aluminum or the like and has a thickness that must be accounted for when measuring flange height. Each flange is typically formed by bending the sheet metal, such that the flange protrudes from and disposed at an angle with respect to the remainder of the component, with a radius disposed at the interior base of the flange where it meets the sheet metal. Measuring the height of such flanges can be challenging and it is sometimes difficult to maintain measurement consistency. It should be noted that the bulk of the vehicle component 10 may be one piece or include multiple pieces, as illustrated in FIG. 2.

Figure 2:
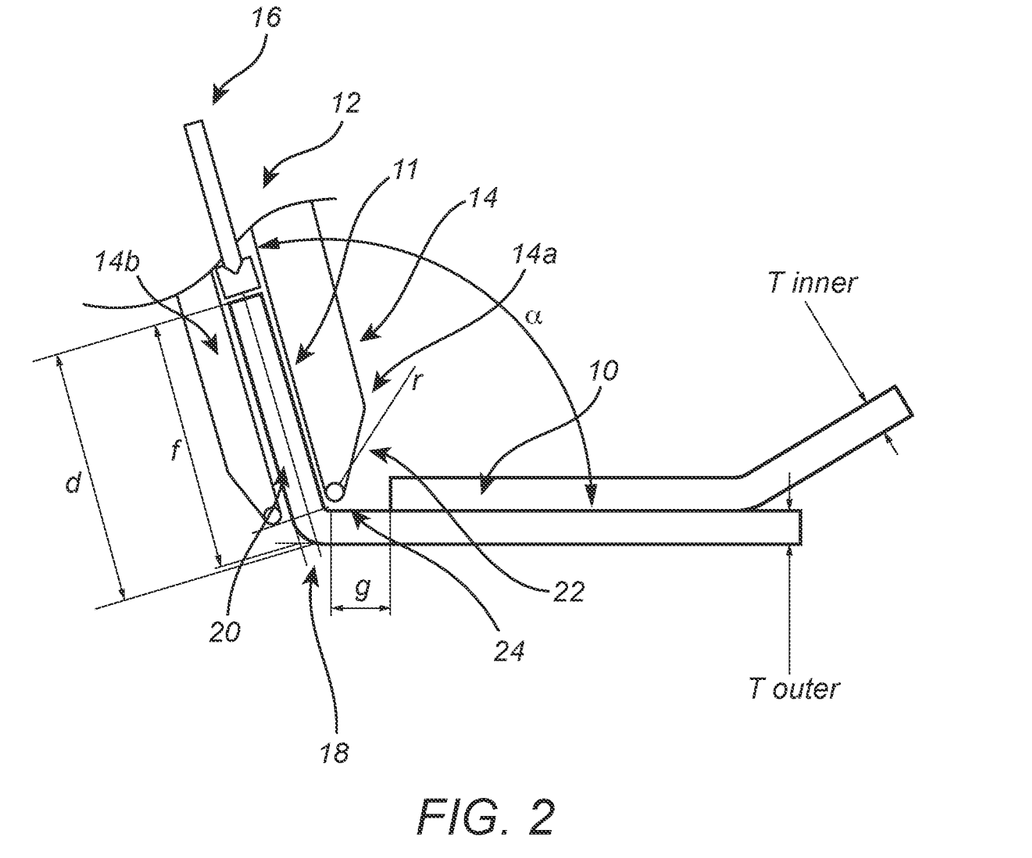
FIG. 2 illustrates the principles of operation of the assembly, adapter device, and method for measuring the height of a flange of the present disclosure.

FIG. 2 illustrates the principles of operation of the assembly 12, adapter device 14, and method 100 (FIG. 8) for measuring the height of a flange 11 of the present disclosure. As is illustrated, the assembly 12 includes a conventional measuring rod 16 that is coupled to a conventional displacement gauge 26 (FIGS. 3 and 4), which may be mechanical, analog, digital, and/or computerized. Such displacement gauges are well known to those of ordinary skill in the art and are not described in greater detail herein. The measuring rod 16 is displaced (i.e., linearly translated) by contact with the end of the flange 11, and the degree of this displacement is measured by the displacement gauge, thereby preferably providing the height of the flange 11, from the component 10 and base of the flange 11 to the end of the flange 11 that protrudes from the component 10. Again, the linear translation of the measuring rod 16 is affected by the thickness of the component 10, as well as the radius of the bend between the component 10 and the flange 11. For example, in the drawing, f represents an uncompensated height measurement carried out using a conventional method, while d represents a compensated height measurement carried out using the method 100 of the present disclosure.

Accordingly, the adapter device 14 is used to surround the flange 11 and provide consistent engagement of the assembly 12 with the interior bottom/radius 18 of the flange 11, providing a channel 20 in which the flange 11 displaces the measuring rod 16. The adapter device 14 includes a first arm 14a that is disposed on a first side of the flange 11 and a second arm 14b that is disposed on a second side of the flange 11. Here, each of the first arm 14a and the second arm 14b includes a tapered tip 22 that terminates in a radius 24, again allowing the adapter device 14 to surround the flange 11 and provide consistent engagement of the assembly 12 with the bottom/radius 18 of the flange 11, even in tight spaces. The first arm 14a and the second arm 14b of the adapter device 14 do not interfere with the linear translation of the measuring rod 16, which makes its measurements as normal. As illustrated, the tapered tip 22 of the first arm 14a terminating in the radius 24, again allowing the adapter device 14 to surround the flange 11 and consistently engage the interior bottom/radius 18 of the flange 11.

Figure 3:
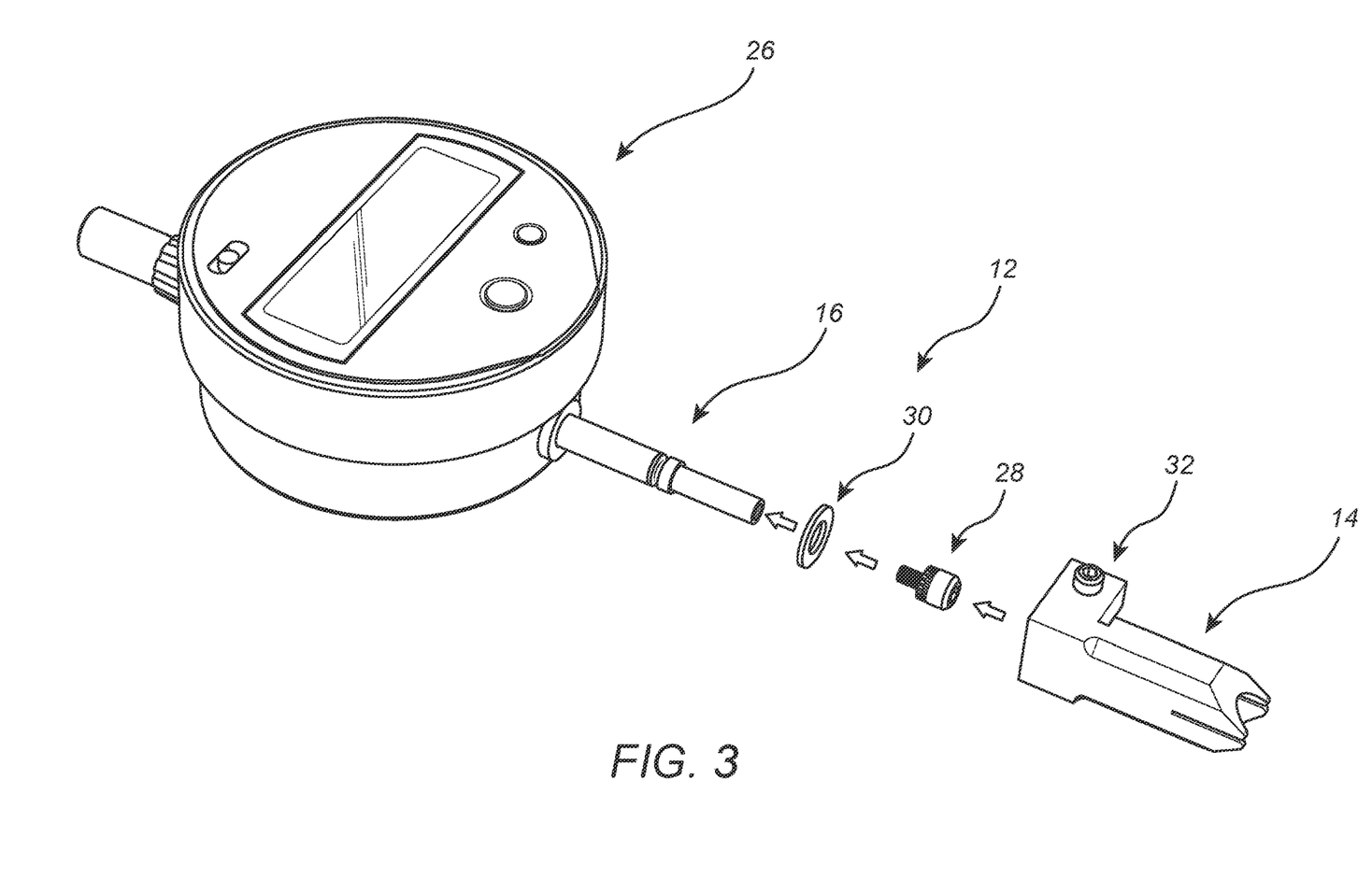
FIG. 3 illustrates the various components of the assembly for measuring the height of a flange of the present disclosure in a disassembled configuration.

FIG. 3 illustrates the various components of the assembly 12 for measuring the height of a flange 11 (FIGS. 1 and 2) of the present disclosure in a disassembled configuration. The assembly 12 includes the displacement gauge 26 and measuring rod 16 described herein above. The measuring rod 16 includes a tip 28 that actually contacts the flange 11 during measurement. A spacer 30 is provided between the adapter device 14 and the displacement gauge 26. The adapter device 14 may be clamped, bolted, and/or otherwise removably affixed to the displacement gauge 26. As illustrated, the adapter device 14 is clamped and removably affixed to the displacement gauge 26 using a set screw 32. It is preferable that the adapter device 14 is securely affixed to the displacement gauge 26 and does not shift or translate with respect to the displacement gauge during or between successive measurements.

Figure 4:
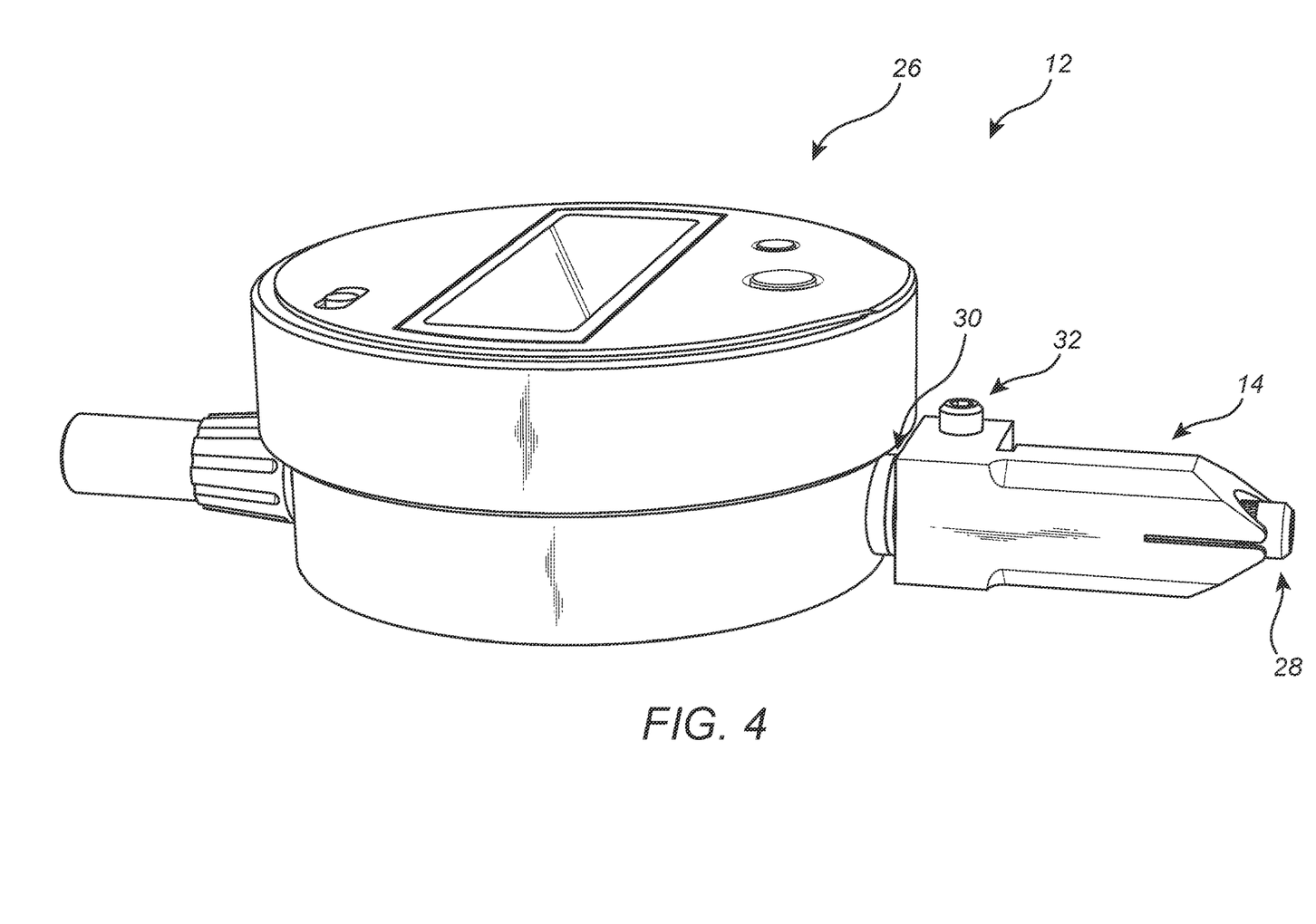
FIG. 4 illustrates the various components of the assembly for measuring the height of a flange of the present disclosure in an assembled configuration.

FIG. 4 illustrates the various components of the assembly 12 for measuring the height of a flange 11 (FIGS. 1 and 2) of the present disclosure in an assembled configuration. Here, it can be seen that the tip 28 of the measuring rod 16 (FIGS. 2 and 3) protrudes slightly from the end of the adapter device 14. This protrusion accounts for a calibrated thickness of the component 10 (FIGS. 1 and 2), as described in greater detail herein below. This calibration factor provides an accurate absolute height for the flange 11.

Figure 5:
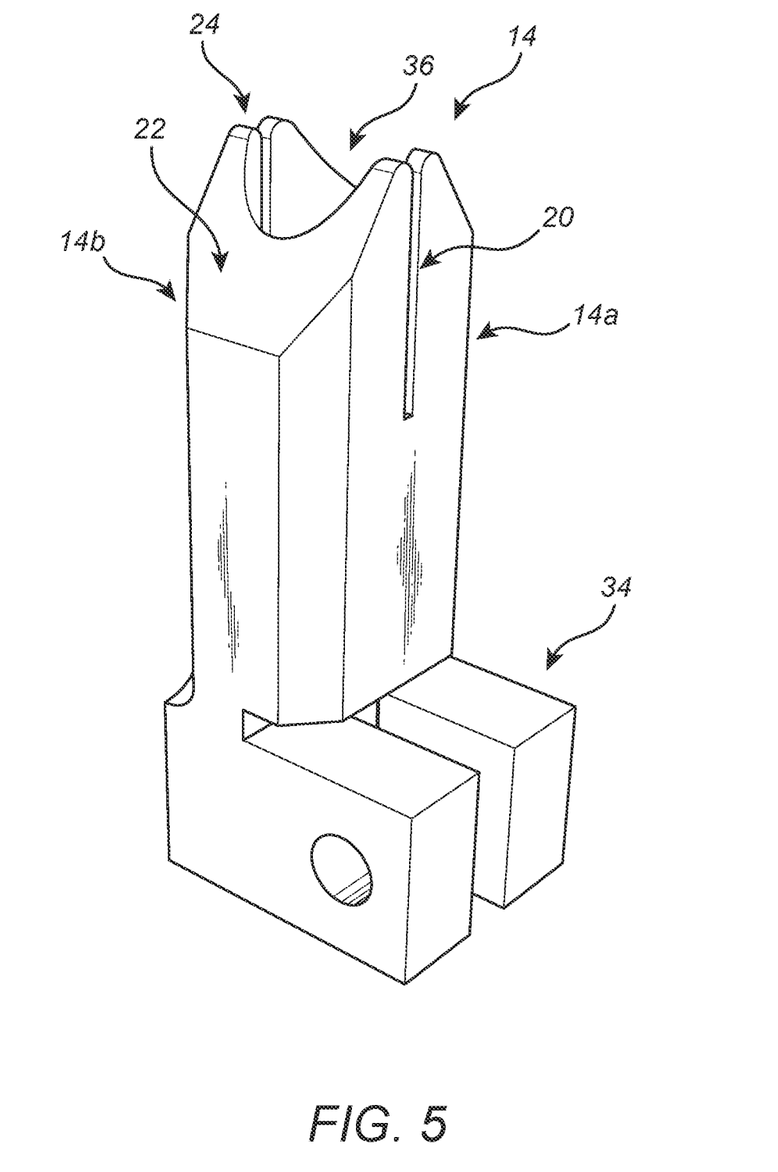
FIG. 5 illustrates the various components of the adapter device for measuring the height of a flange of the present disclosure.

FIG. 5 illustrates the various components of the adapter device 14 for measuring the height of a flange 11 (FIGS. 1 and 2) of the present disclosure. Again, the adapter device 14 includes a first arm 14a that is disposed on a first side of the flange 11 and a second arm 14b that is disposed on a second side of the flange 11. Each of the first arm 14a and the second arm 14b includes a tapered tip 22 that terminates in a radius 24, again allowing the adapter device 14 to surround the flange 11 and provide consistent engagement of the assembly 12 with the bottom/radius 18 (FIG. 2) of the flange 11, even in tight spaces. It is also possible that only one of the first arm 14a and the second arm 14b includes the tapered tip 22 and/or radius 24, if the desired application so allows. The first arm 14a and the second arm 14b of the adapter device 14 do not interfere with the linear translation of the measuring rod 16 (FIGS. 2 and 3), which makes its measurements as normal. The adapter device 14 includes a base structure 34 by which the adapter device 14 is coupled to the displacement gauge 26 (FIGS. 3 and 4), in this case in a clamped configuration. The first arm 14a and the second arm 14b of the adapter device 14 further include a cut-away 36 at an end thereof that allows engagement of the measuring rod 16 (FIGS. 2 and 3) with the end of the flange 11 to be visualized. The channel 20 between the first arm 14a and the second arm 14b of the adapter device 14 is optionally slightly wider than the flange 11 to be measured, such that the adapter device 14 does not bind on the flange 11 and the heights of different flanges 11 can be measured using the same adapter device 14.

Figure 6:
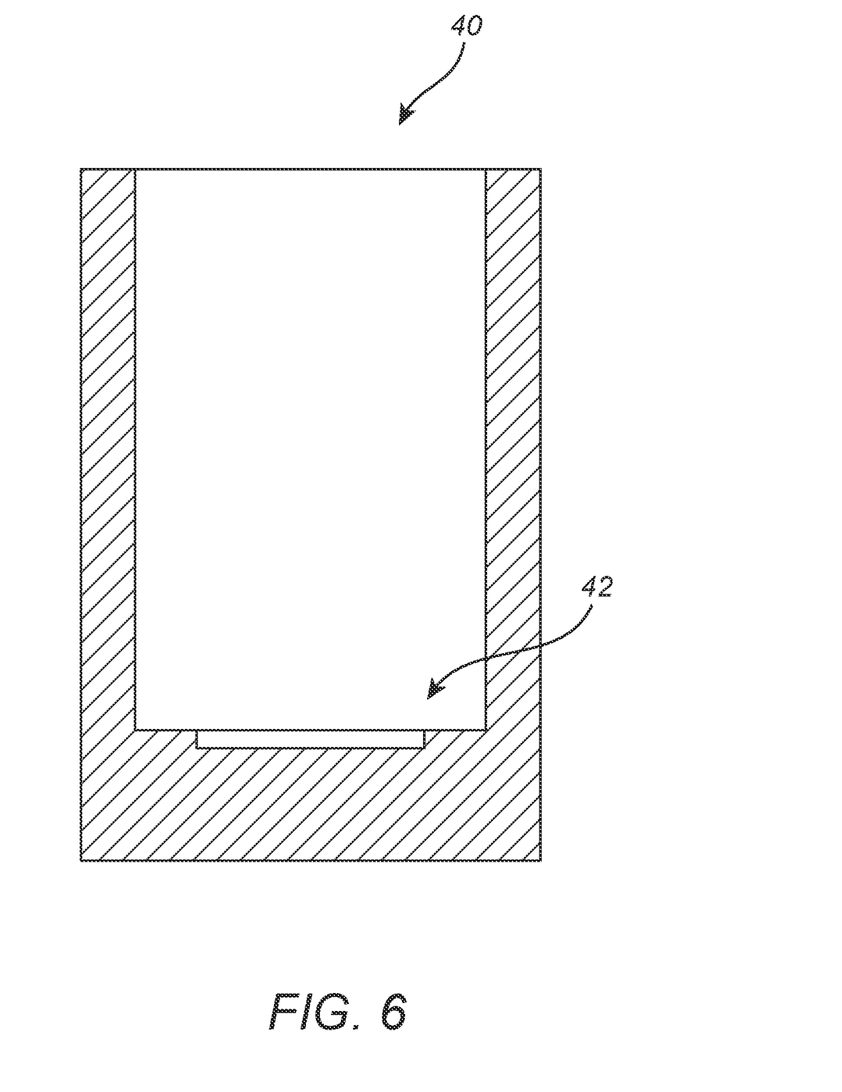
FIG. 6 illustrates a calibration sleeve used with the adapter device for measuring the height of a flange of the present disclosure.

FIG. 6 illustrates a calibration sleeve 40 used with the adapter device 14 for measuring the height of a flange 11 (FIGS. 1 and 2) of the present disclosure. Specifically, it is important that the assembly 12 (FIGS. 2-4) be calibrated to account for the thickness of the component 10 (FIGS. 1 and 2) as well as the bend radius 18 (FIG. 2) associated with the flange 11, such that an accurate and reproducible absolute height of the flange 11 can be measured. This is accomplished by providing the protrusion 28 of FIG. 4 beyond the end of the adapter device 14. This protrusion 28 is provided predictably and reproducibly via a cut-away 42 provided in the bottom of the calibration sleeve 40. This cut-away 42 has a predetermined depth based on the thickness of the component 10, and therefore subsequently accounts for this thickness when a measurement is made. The displacement gauge 26 (FIGS. 3 and 4) is zeroed with the adapter device 14 disposed in the calibration sleeve 40 and the measuring rod 16 (FIGS. 2 and 3) engaging the cut-away 42, which is again sized, depth-wise, based on the thickness of the component 10.

Figure 7:
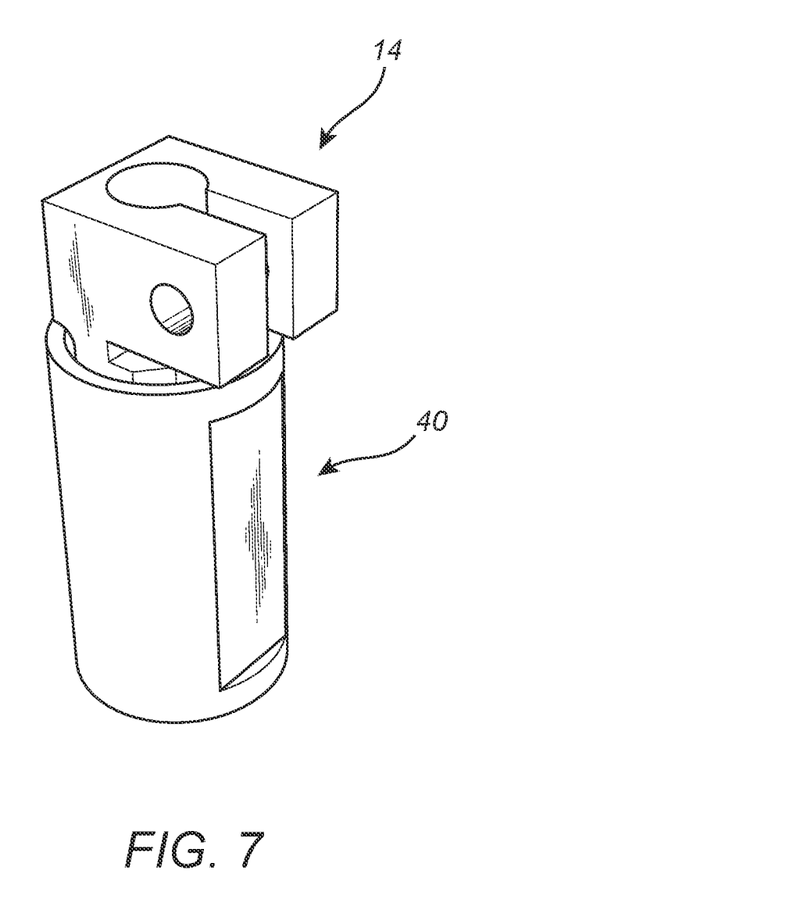
FIG. 7 illustrates the adapter device for measuring the height of a flange of the present disclosure disposed within the calibration sleeve of the present disclosure.

FIG. 7 illustrates the adapter device 14 for measuring the height of a flange 11 (FIGS. 1 and 2) of the present disclosure disposed within the calibration sleeve 40 of the present disclosure.

Figure 8:
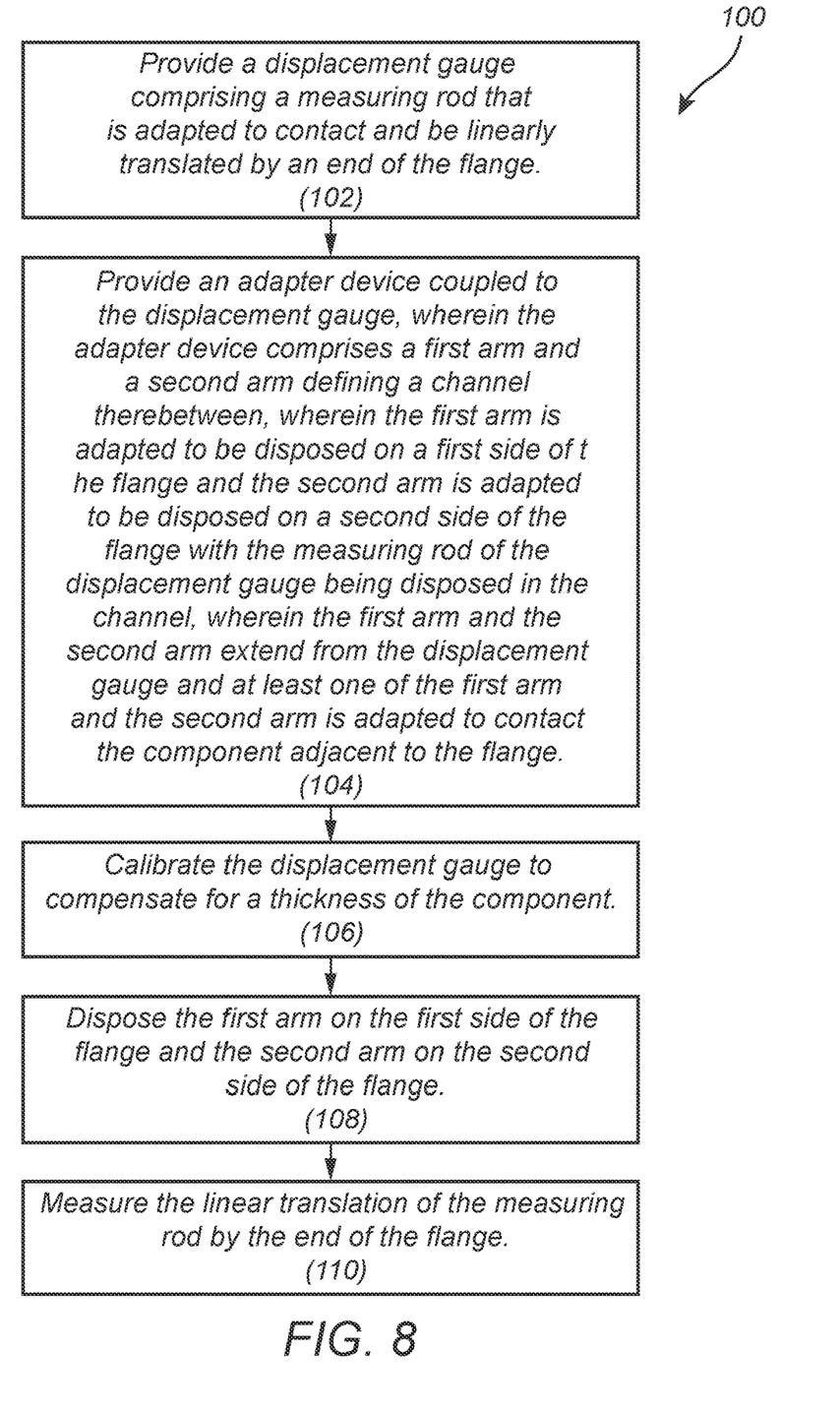
FIG. 8 illustrates the method for measuring the height of a flange of the present disclosure.

FIG. 8 illustrates the method 100 for measuring the height of a flange of the present disclosure. The method 100 includes providing a displacement gauge including a measuring rod that is adapted to contact and be linearly translated by an end of the flange (step 102) and providing an adapter device coupled to the displacement gauge, wherein the adapter device includes a first arm and a second arm defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the component adjacent to the flange (step 104). The method 100 also includes calibrating the displacement gauge to compensate for a thickness of the component (step 106). The method 100 further includes disposing the first arm on the first side of the flange and the second arm on the second side of the flange (step 108). Finally, the method 100 includes measuring the linear translation of the measuring rod by the end of the flange (step 110). An end of at least one of the first arm and the second arm is tapered. An end of at least one of the first arm and the second arm terminates in a radius. At least one of the first arm and the second arm is adapted to contact a radius disposed between the component and the flange at a base of the flange. Optionally, the method 100 includes calibrating the displacement gauge to compensate for the thickness of the component by linearly translating the measuring rod away from the displacement gauge corresponding to the thickness of the component and zeroing the displacement gauge. Optionally, the method 100 further includes limiting the linear translation of the measuring rod away from the displacement gauge using a calibration sleeve that is disposed about the adapter device. Optionally, the calibration sleeve is one of a plurality of calibration sleeves each corresponding to a given component thickness. Optionally, the method 100 further includes recording the linear translation of the measuring rod and measurement of the height of the flange of the component using a processor and a memory coupled to the displacement gauge.

The processor is a hardware device for executing software instructions. The processor may be any custom made or commercially available processor, a central processing unit (CPU), an auxiliary processor among several processors associated with a server, a semiconductor-based microprocessor (in the form of a microchip or chipset), or generally any device for executing software instructions. When the server is in operation, the processor is configured to execute software stored within a memory, to communicate data to and from the memory, and to generally control operations of the server pursuant to the software instructions. Input/output (I/O) interfaces may be used to receive user input from and/or for providing system output to one or more devices or components.

A network interface may be used to enable the server to communicate on a network, such as the Internet. The network interface may include, for example, an Ethernet card or adapter (e.g., 10BaseT, Fast Ethernet, Gigabit Ethernet, or 10GbE) or a Wireless Local Area Network (WLAN) card or adapter (e.g., 802.11a/b/g/n/ac). The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server, such as, for example, an internal hard drive connected to a local interface in the server. Additionally, in another embodiment, the data store may be located external to the server such as, for example, an external hard drive connected to the I/O interfaces (e.g., a SCSI or USB connection). In a further embodiment, the data store may be connected to the server through a network, such as, for example, a network-attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another but can be accessed by the processor. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Thus, again, the present disclosure provides an assembly, adapter device, and method that utilize a standard displacement gauge or the like to measure the height of a flange, such as a flange formed via bending a planar vehicle component with a given thickness and, thus, including a radius at the bottom. This assembly, adapter device, and method provide consistent measurements across components, operators, education and experience levels, etc. The adapter device is designed to engage the flange being measured in such a way that consistent engagement of the adapter device with the radius, and, thus, consistent engagement of the assembly with the flange, is provided for measurement.

Although the present disclosure is illustrated and described herein with reference to illustrative embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. An assembly for measuring a height of a flange protruding from a component, the flange having a thickness that is less than the height of the flange and adjoining the component at a radius, the assembly comprising:
    a displacement gauge comprising a measuring rod that is adapted to contact and be linearly translated by an end of the flange; and
    an adapter device coupled to the displacement gauge, wherein the adapter device comprises a first arm and a second arm defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the radius adjoining the flange and the component.

2. The assembly of claim 1, wherein an end of at least one of the first arm and the second arm is tapered to contact the radius adjoining the flange and the component.

3. The assembly of claim 1, wherein an end of at least one of the first arm and the second arm terminates in a radius to contact the radius adjoining the flange and the component.

4. The assembly of claim 1, wherein a tip of the measuring rod of the displacement gauge protrudes from the channel and an end of each of the first arm and the second arm by a distance corresponding to a thickness of the component such that the thickness of the component is accounted for in a measurement of the height of the flange of the component as measured by displacement of the measuring rod by the end of the flange.

5. The assembly of claim 1, further comprising a processor and a memory coupled to the displacement gauge operable for recording a linear translation of the measuring rod and measurement of the height of the flange of the component.

6. An adapter device for measuring a height of a flange protruding from a component, the flange having a thickness that is less than the height of the flange and adjoining the component at a radius, the adapter device comprising:
a base structure adapted to be coupled to a displacement gauge comprising a measuring rod that is adapted to contact and be linearly translated by an end of the flange; and
a first arm and a second arm coupled to the base structure and defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the radius adjoining the flange and the component.

7. The adapter device of claim 6, wherein an end of at least one of the first arm and the second arm is tapered to contact the radius adjoining the flange and the component.

8. The adapter device of claim 6, wherein an end of at least one of the first arm and the second arm terminates in a radius to contact the radius adjoining the flange and the component.

9. The adapter device of claim 6, wherein the base structure forms a clamp adapted to secure the adapter device to the displacement gauge.

10. The adapter device of claim 6, wherein a tip of the measuring rod of the displacement gauge protrudes from the channel and an end of each of the first arm and the second arm by a distance corresponding to a thickness of the component such that the thickness of the component is accounted for in a measurement of the height of the flange of the component as measured by displacement of the measuring rod by the end of the flange.

11. A method for measuring a height of a flange protruding from a component, the flange having a thickness that is less than the height of the flange and adjoining the component at a radius, the method comprising:
providing a displacement gauge comprising a measuring rod that is adapted to contact and be linearly translated by an end of the flange;
providing an adapter device coupled to the displacement gauge, wherein the adapter device comprises a first arm and a second arm defining a channel therebetween, wherein the first arm is adapted to be disposed on a first side of the flange and the second arm is adapted to be disposed on a second side of the flange with the measuring rod of the displacement gauge being disposed in the channel, wherein the first arm and the second arm extend from the displacement gauge and at least one of the first arm and the second arm is adapted to contact the radius adjoining the flange and the component;
calibrating the displacement gauge to compensate for a thickness of the component;
disposing the first arm on the first side of the flange and the second arm on the second side of the flange with at least one of the first arm and the second arm contacting the radius adjoining the flange and the component; and
measuring the linear translation of the measuring rod by the end of the flange.

12. The method of claim 11, wherein an end of at least one of the first arm and the second arm is tapered to contact the radius adjoining the flange and the component.

13. The method of claim 11, wherein an end of at least one of the first arm and the second arm terminates in a radius to contact the radius adjoining the flange and the component.

14. The method of claim 11, further comprising calibrating the displacement gauge to compensate for the thickness of the component by linearly translating the measuring rod away from the displacement gauge corresponding to the thickness of the component and zeroing the displacement gauge.

15. The method of claim 14, further comprising limiting the linear translation of the measuring rod away from the displacement gauge using a calibration sleeve that is disposed about the adapter device.

16. The method of claim 15, wherein the calibration sleeve is one of a plurality of calibration sleeves each corresponding to a given component thickness.

17. The method of claim 11, further comprising recording the linear translation of the measuring rod and measurement of the height of the flange of the component using a processor and a memory coupled to the displacement gauge.

* * * * *